US011311870B2

(12) United States Patent
Smith et al.

(10) Patent No.: US 11,311,870 B2
(45) Date of Patent: Apr. 26, 2022

(54) PROCESSES FOR REDUCING THE LOSS OF CATALYST ACTIVITY OF A ZIEGLER-NATTA CATALYST

(71) Applicant: ExxonMobil Chemical Patents Inc., Baytown, TX (US)

(72) Inventors: Edward F. Smith, Houston, TX (US); George A. Vaughan, Houston, TX (US); Michael Awe, Langhorne, PA (US); James R. Sollen, Ontario (CA); Ronald N. Cooke, Ontario (CA); Sateesh K. Rajput, Ontario (CA); Ahmed H. Ali, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 144 days.

(21) Appl. No.: 16/484,234

(22) PCT Filed: Dec. 13, 2017

(86) PCT No.: PCT/US2017/065969
§ 371 (c)(1),
(2) Date: Aug. 7, 2019

(87) PCT Pub. No.: WO2018/147931
PCT Pub. Date: Aug. 16, 2018

(65) Prior Publication Data
US 2020/0030785 A1    Jan. 30, 2020

Related U.S. Application Data

(60) Provisional application No. 62/455,764, filed on Feb. 7, 2017.

(51) Int. Cl.
| | |
|---|---|
| *C08F 4/654* | (2006.01) |
| *C08F 4/655* | (2006.01) |
| *C08F 10/00* | (2006.01) |
| *B01J 38/00* | (2006.01) |
| *B01J 31/22* | (2006.01) |
| *B01J 31/26* | (2006.01) |
| *C08F 10/02* | (2006.01) |
| *C08F 10/06* | (2006.01) |

(52) U.S. Cl.
CPC ............... *B01J 38/00* (2013.01); *B01J 31/22* (2013.01); *B01J 31/26* (2013.01); *C08F 4/655* (2013.01); *C08F 10/02* (2013.01); *C08F 10/06* (2013.01); *B01J 2231/122* (2013.01); *B01J 2531/46* (2013.01)

(58) Field of Classification Search
CPC ................. C08F 4/654; C08F 4/655
See application file for complete search history.

(56) References Cited

U.S. PATENT DOCUMENTS

| | | | |
|---|---|---|---|
| 3,065,220 | A | 11/1962 | McManimie et al. |
| 3,857,795 | A | 12/1974 | van der Bend et al. |
| 4,210,729 | A | 7/1980 | Hermans et al. |
| 4,293,673 | A | 10/1981 | Hamer et al. |
| 4,302,565 | A | 11/1981 | Goeke et al. |
| 4,460,755 | A | 7/1984 | Williams et al. |
| 5,290,745 | A | 3/1994 | Jorgensen et al. |
| 6,187,666 | B1 | 2/2001 | Singh et al. |
| 6,365,537 | B1 | 4/2002 | Windisch |
| 6,440,745 | B1 | 8/2002 | Weinberg et al. |
| 2003/0008982 | A1 | 1/2003 | Mahling et al. |
| 2003/0161763 | A1 | 8/2003 | Erden et al. |
| 2007/0032614 | A1 | 2/2007 | Goossens et al. |

FOREIGN PATENT DOCUMENTS

| | | |
|---|---|---|
| DE | 4339168 | 5/1994 |
| EP | 0144716 A | 6/1985 |
| WO | 1999/064160 | 12/1999 |
| WO | 2000/009255 | 2/2000 |
| WO | 2001/098371 | 12/2001 |
| WO | 2005/068076 | 7/2005 |
| WO | 2006/022918 | 3/2006 |
| WO | 2006/086104 | 8/2006 |
| WO | 2008/060512 | 5/2008 |

OTHER PUBLICATIONS

Brummer, Oliver et al., "High-Throughput Screening Applied To Process Development," Handbook of Combinatorial Chemistry, vol. 2, pp. 864-884, 2002.
Boussie, T. R. et al., "A Fully Integrated High-Throughput Screening Methodology for the Discovery of New Polyolefin Catalysts: Discovery of a New Class of High Temperature Single-Site Group (IV) Copolymerization Catalysts," Journal of the American Chemical Society, 125 (14), pp. 4306-4317, 2003.
Murphy, Vince et al., "High-Throughput Approaches For The Discovery And Optimization Of New Olefin Polymerization Catalysts," Chemical Record, 2(4), pp. 278-289, 2002.

*Primary Examiner* — Caixia Lu
(74) *Attorney, Agent, or Firm* — ExxonMobil Chemical Patents Inc.-Law Department

(57) ABSTRACT

A process for reducing the loss of catalyst activity of a Ziegler-Natta catalyst is provided. The process includes preparing a Ziegler-Natta (ZN) catalyst by contacting the ZN catalyst with at least one aluminum alkyl compound to produce a reduced ZN catalyst and storing and/or transporting the reduced ZN catalyst for at least 20 days at a temperature of 25° C. or less. The reduced ZN catalyst may be used for polymerizing polyolefin polymers.

18 Claims, 2 Drawing Sheets

PROCESSES FOR REDUCING THE LOSS OF CATALYST ACTIVITY OF A ZIEGLER-NATTA CATALYST

PRIORITY CLAIM

This application is a National Phase Application claiming priority to PCT Application Serial No. PCT/US2017/065969 filed Dec. 13, 2017, which claims priority to and the benefit of U.S. Ser. No. 62/455,764, filed Feb. 7, 2017 and are incorporated by reference in their entirety.

FIELD OF THE INVENTION

Embodiments herein generally relate to processes for reducing the loss of catalyst activity of a Ziegler-Natta (ZN) catalyst. The ZN catalyst may then be used in polymerization processes for the production of polyolefin polymers.

BACKGROUND OF THE INVENTION

Ziegler-Natta ("ZN") catalysts are widely used to polymerize ethylene and propylene monomers into polyolefin polymers. ZN catalysts can be exemplified by the magnesium/titanium catalyst system described in U.S. Pat. Nos. 4,302,565 and 4,460,755, and the pre-activation procedure using a mixture of organometallic compounds as described in U.S. Pat. No. 6,187,666. The catalysts are typically dry powders such as the commercially available UCAT™ A Catalyst available from Univation Technologies, LLC, Houston, Tex. Other ZN catalysts are formed by spray drying and used in slurry form. Such a catalyst, for example contains titanium, magnesium, and an electron donor, and optionally, and aluminum halide. The catalyst is then introduced into a hydrocarbon medium such as mineral oil to provide the slurry form. Such a spray dried slurry catalyst is described in U.S. Pat. Nos. 4,293,673 and 5,290,745.

For ZN catalysts stored and/or transported to polymerization units as powders, catalyst activity may suffer when stored and/or transported for longer period of times or when stored and/or transported at elevated temperatures such as those temperatures typical of tropical or arid regions. Thus, catalyst activity, reduction of production rates, varying comonomer and hydrogen responses, and polymer properties can be affected due to aging of the catalyst. "Aging" is typically described as catalyst deactivation or loss of catalyst activity. For example, the degree of aging is typically ascertained by measuring the activity or productivity of a given catalyst batch over an extended period.

Various methods and systems for testing catalyst systems have been developed. For instance, Brummer, Oliver et al., "High-Throughput Screening Applied To Process Development," Handbook of Combinatorial Chemistry, Vol. 2, 2002, pages 864-884; Boussie, T. R. et al., "A Fully Integrated High-Throughput Screening Methodology for the Discovery of New Polyolefin Catalysts: Discovery of a New Class of High Temperature Single-Site Group (IV) Copolymerization Catalysts," Journal of the American Chemical Society (2003), 125(14), pages 4306-4317; Murphy, Vince et al., "High-Throughput Approaches For The Discovery And Optimization Of New Olefin Polymerization Catalysts," Chemical Record (2002), 2(4), pages 278-289; and Boussie T. R. et al., "A Fully Integrated High-Throughput Screening Methodology For The Discovery Of New Polyolefin Catalysts Discovery Of A New Class Of High Temperature Single-Site Group (IV) Copolymerization Catalysts," Journal of the American Chemical Society (2003), 125(14), pages 4306-17, generally, discuss methods of using high-throughput screening methods and devices in the development and evaluation of catalyst systems. Various test methods are also discussed in U.S. Pat. No. 6,440,745, U.S. Publication No. 2003/161763, and PCT Publications WO 1999/064160, WO 2001/098371, and WO 2000/009255. Other background references include WO 2005/068076, WO 2006/022918, WO 2006/086104, and WO 2008/060512.

However, there remains a need to reduce the loss of catalyst activity in polymerization processes that employ ZN catalysts, especially those ZN catalysts that are reduced with aluminum alkyl compounds that are stored and/or transported as dry powders.

SUMMARY OF THE INVENTION

In a class of embodiments, the invention provides for a process for reducing the loss of catalyst activity of a Ziegler-Natta catalyst, the process comprising: a) preparing a Ziegler-Natta (ZN) catalyst by contacting the ZN catalyst with at least one aluminum alkyl compound to produce a reduced ZN catalyst; b) optionally, drying the reduced ZN catalyst; and c) storing and/or transporting the reduced ZN catalyst for at least 20 days at a temperature of 25° C. or less.

In another class of embodiments, the invention provides for a process comprising: storing and/or transporting a reduced ZN catalyst for at least 20 days at a temperature of 25° C. or less; contacting the reduced ZN catalyst with one or more one or more olefin monomers under polymerizable conditions; and recovering the polyolefin polymers.

Other embodiments of the invention are described and claimed herein and are apparent by the following disclosure.

DETAILED DESCRIPTION

Figure 1:
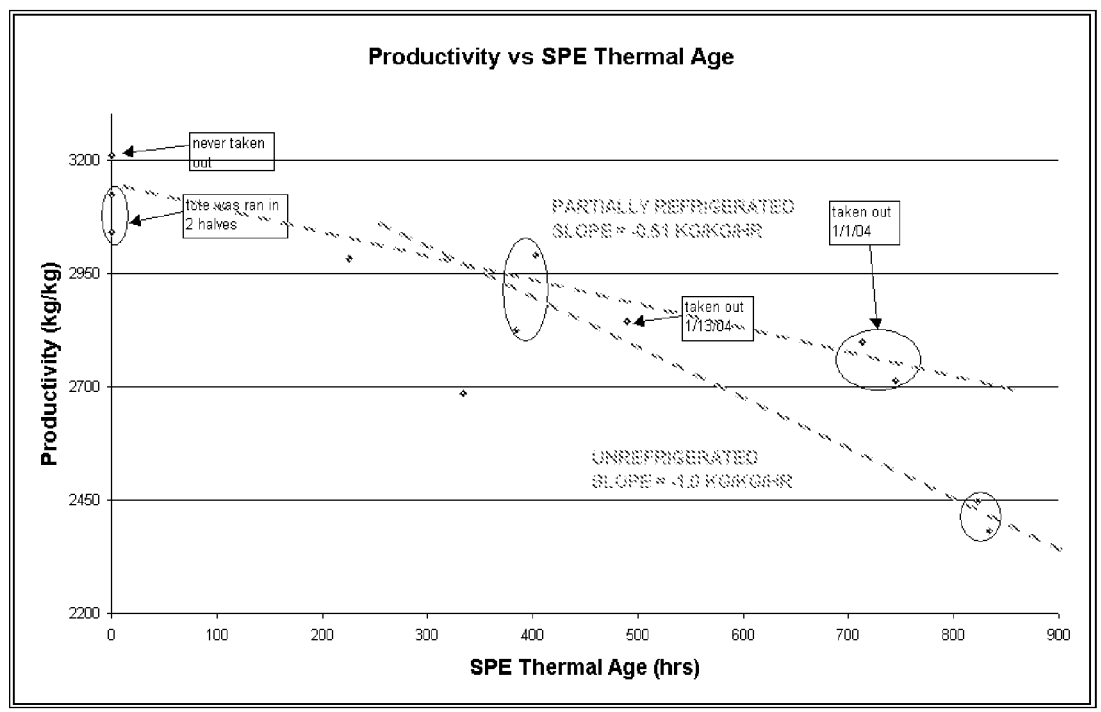
FIG. 1 is a graph showing the thermal aging of ZN catalysts in terms of catalyst productivity and time.

Before the present compounds, components, compositions, and/or processes are disclosed and described, it is to be understood that unless otherwise indicated this invention is not limited to specific compounds, components, compositions, reactants, reaction conditions, ligands, structures, or the like, as such may vary, unless otherwise specified. It is also to be understood that the terminology used herein is for the purpose of describing particular embodiments only and is not intended to be limiting.

Processes for reducing the loss of catalyst activity are provided. In a class of embodiments, the catalyst may have a fresh catalyst activity and aged, stored and/or transported at a controlled temperature to provide an aged catalyst system having an aged catalyst activity that is at least 75% of the fresh catalyst activity. As used herein, "fresh catalyst activity" refers to the catalyst activity of the catalyst system when it is fed to the polymerization system soon (before the catalyst substantially changes) after the catalyst is manufactured.

As used herein, "catalyst aging" refers to the phenomenon wherein the responses of the catalyst change over a period of time during which the catalyst is stored and/or transported after manufacture. These changes in catalyst responses are reflected in the fact that the catalyst will have different response(s) when compared to producing a polymer at the same conditions with a catalyst made by the same recipe but one which has been stored and/or transported under different conditions and for a different period of time.

As used herein, "aged catalyst activity" refers to the catalyst activity of a catalyst when it is fed to the polymerization system after the catalyst has been stored and/or transported for a period of time, typically for more than 5 days, preferably for more than about 30 days, more preferably for more than about 60 days, and even more preferably for more than about 100 days. In one embodiment of the invention, the aged catalyst activity is at least about 75% of the fresh catalyst activity, preferably greater than about 85% of the fresh catalyst activity, and even more preferably greater than about 90% of the fresh catalyst activity.

As used herein, "at a controlled temperature" refers to maintaining the temperature within given range taking into account the temperature at times may exceed either end of the range so long as the nature of the chemical or composition that is being controlled at a given temperature or temperature range is not materially altered or effected. For example, the controlled temperature can be 25° C. or less; 23° C. or less; 20° C. or less; 18° C. or less; 15° C. or less; 12° C. or less, 10° C. or less; 5° C. or less; or 2° C. or less. The controlled temperature also can be a temperature that is maintained within 30° C. (+/− of a given temperature); alternatively, within 20° C. (+/− of a given temperature); alternatively, within 10° C. (+/− of a given temperature); alternatively, within 5° C. (+/− of a given temperature); and alternatively, within 2° C. (+/− of a given temperature).

In another class of embodiments, the invention provides for a process for polymerizing polyolefin polymers, the process comprising: a) preparing a Ziegler-Natta (ZN) catalyst by contacting the ZN catalyst with at least one aluminum alkyl compound to produce a reduced ZN catalyst; b) optionally, drying the reduced ZN catalyst; c) storing and/or transporting the reduced ZN catalyst for at least 20 days at a temperature of 25° C. or less; d) polymerizing one or more olefin monomers under polymerizable conditions with the reduced ZN catalyst; and e) recovering the polyolefin polymers. As used herein, "polymerizable conditions" refer those conditions including a skilled artisan's selection of temperature, pressure, reactant concentrations, optional solvent/diluents, reactant mixing/addition parameters, and other conditions within at least one polymerization reactor that are conducive to the reaction of one or more olefin monomers when contacted with an activated olefin polymerization catalyst to produce the desired polyolefin polymer.

Ziegler-Natta (ZN) Catalysts

The terms "catalyst" and "catalyst system" are intended to be used interchangeably and refer to any one or more polymerization catalysts, activators, co-catalysts, supports/carriers, or combinations thereof. The catalyst, for example, may include any Ziegler-Natta (ZN) transition metal catalyst, such as those catalysts disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290,745; 5,093,415 and 6,562,905. Other examples of ZN catalysts are discussed in U.S. Pat. Nos. 4,115,639; 4,077,904; 4,482,687; 4,564,605; 4,721,763; 4,879,359 and 4,960,741. In general, ZN catalysts include transition metal compounds from Groups 3 to 17, or Groups 4 to 12, or Groups 4 to 6 of the Periodic Table of Elements. As used herein, all reference to the Periodic Table of the Elements and groups thereof is to the NEW NOTATION published in Hawley's Condensed Chemical Dictionary, Thirteenth Edition, John Wiley & Sons, Inc., (1997), unless reference is made to the Previous IUPAC form denoted with Roman numerals (also appearing in the same), or unless otherwise noted. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

ZN catalysts may be represented by the formula: $MR_x$, where M is a metal from Groups 3 to 17, preferably Groups 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride.

In a class of embodiments, the ZN catalysts may include at least one titanium compound having the formula $Ti(OR)_aX_b$, wherein R is selected from the group consisting of a $C_1$ to $C_{25}$ aliphatic or aromatic, substituted or unsubstituted, hydrocarbyl group; X is selected from the group consisting of Cl, Br, I, and combinations thereof; a is selected from the group consisting of 0, 1 and 2; b is selected from the group 1, 2, 3, and 4; and a+b=3 or 4. As used herein, "hydrocarbyl" refers to a moiety comprising hydrogen and carbon atoms.

Non-limiting examples where M is titanium include $TiCl_3$, $TiCl_4$, $TiBr_4$, $Ti(OCH_3)Cl_3$, $Ti(OC_2H_5)_3Cl$, $Ti(C_2H_5)Cl_3$, $Ti(OC_4H_9)_3Cl$, $Ti(OC_3H_7)_2Cl_2$, $Ti(OC_2H_5)_2Br_2$, $Ti(OC_6H_5)Cl_2$, $Ti(OCOCH_3)Cl_3$, $Ti(OCOC_6H_5)Cl_3$, $TiCl_3/3AlCl_3$, $Ti(OC_{12}H_{25})Cl_3$, and combinations thereof.

In a class of embodiments, the ZN catalysts may include at least one magnesium compound. The at least one magnesium compound may have the formula $MgX_2$, wherein X is selected from the group consisting of Cl, Br, I, and combinations thereof. The at least one magnesium compound may be selected from the group consisting of: $MgCl_2$, $MgBr_2$ and $MgI_2$. ZN catalysts based on magnesium/titanium electron-donor complexes that are useful in the invention are described in, for example, U.S. Pat. Nos. 4,302,565 and 4,302,566. ZN catalysts derived from Mg/Ti/Cl/THF are also contemplated, which are well known to those of ordinary skill in the art.

Still other suitable ZN catalysts are disclosed in U.S. Pat. Nos. 4,124,532; 4,302,565; 4,302,566; 4,376,062; 4,379,758; 5,066,737; 5,763,723; 5,849,655; 5,852,144; 5,854,164 and 5,869,585 and published EP-A2 0 416 815 A2 and EP-A1 0 420 436.

Co-Catalysts

The catalyst system may further be contacted with a co-catalyst also known as an activator or modifier, for example, at least one alkyl aluminum compound. Suitable co-catalysts may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Non-limiting examples of co-catalysts include methyllithium, butyllithium, dihexylmercury, butylmagnesium, diethylcadmium, benzylpotassium, diethylzinc, tri-n-butylaluminum, diisobutyl ethylboron, diethylcadmium, di-n- butylzinc and tri-n-amylboron, and, in particular, the aluminum alkyl compounds, such as tri-hexyl-aluminum, triethylaluminum, trimethylaluminum, and triisobutylaluminum. Other co-catalysts include mono-organohalides and hydrides of Group 2 metals, and mono- or di-organohalides and hydrides of Group 3 and 13 metals. Non-limiting examples of these co-catalysts include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Additional co-catalysts may be found in U.S. Pat. Nos. 3,221,002 and 5,093,415.

In a class of embodiments, the aluminum alkyl compound may be selected from the group consisting of at least one of tri-n-hexyl aluminum, triethyl aluminum, diethyl aluminum chloride, trimethyl aluminum, dimethyl aluminum chloride, methyl aluminum dichloride triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{12}O)AlCl_2$, and combinations thereof.

Supports

The catalyst system may optionally be supported. The terms "support" or "carrier" are used interchangeably herein and refer to any support material, including inorganic or organic support materials. The term "supported" as used herein refers to one or more compounds that are deposited on, contacted with, vaporized with, bonded to, or incorporated within, adsorbed or absorbed in, or on, a support or carrier. In some embodiments, the support material can be a porous or semi-porous support material. In other embodiments, the support material can be a non-porous support material.

Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms. Non-limiting examples of inorganic support materials include inorganic oxides and inorganic chlorides.

Commercial supports include the ES70 and ES757 family of silicas available from PQ Corporation, Malvern, Pa. Other commercial supports include Sylopol™ Silica Supports including 955 silica and 2408 silica available from Grace Catalyst Technologies, Columbia, Md.

Examples of supporting a catalyst system are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,468,702; and 6,090,740; and PCT Publication Nos. WO 95/32995; WO 95/14044; WO 96/06187; and WO 97/02297.

In a class of embodiments, one general example of preparing a ZN catalyst includes the following: dissolve $TiCl_4$ in a heterocyclic solvent such as tetrahydrofuran (THF) or oxolane, reduce the compound to $TiCl_3$ using Mg or other suitable reduction agent, add $MgCl_2$, and remove the solvent. The $MgTiCl_6$ (ethyl acetate)$_4$ derivative is particularly preferred.

In another class of embodiments, a ZN catalyst may be prepared by providing a precursor composition of the ZN catalyst comprising at least one titanium compound; contacting the at least one titanium compound in the precursor composition with the aluminum alkyl compound in a hydrocarbon solvent, such as an alkane (e.g., pentane or isopentane) or aliphatic mineral oil, where the aluminum alkyl compound converts the at least one titanium compound in the precursor composition into a modified state of the ZN catalyst; and removing at least a portion of the aluminum alkyl compound in the hydrocarbon solvent not consumed in converting the at least one titanium compound into the modified state. The hydrocarbon solvent may also be selected from the group consisting of at least one of isopentane, hexane, heptane, toluene, xylene, naptha, and combinations thereof.

Optionally, the hydrocarbon solvent may be removed from the modified precursor composition of the ZN catalyst. In a class of embodiments, a schematic is provided as FIG. 2 of the synthesis of a ZN catalyst followed by a reduction of the ZN catalyst with at least one alkyl aluminum compound. The reduction process may include taking the precursor ZN catalyst in a hydrocarbon solvent, such as, for example, an alkane (e.g., pentane or isopentane), contacting the precursor with one or more alkyl aluminum compounds, such as TMA, TEAL, TIBA, DEAC, TMAC and/or TNHAL, and drying the ZN catalyst.

Figure 2:
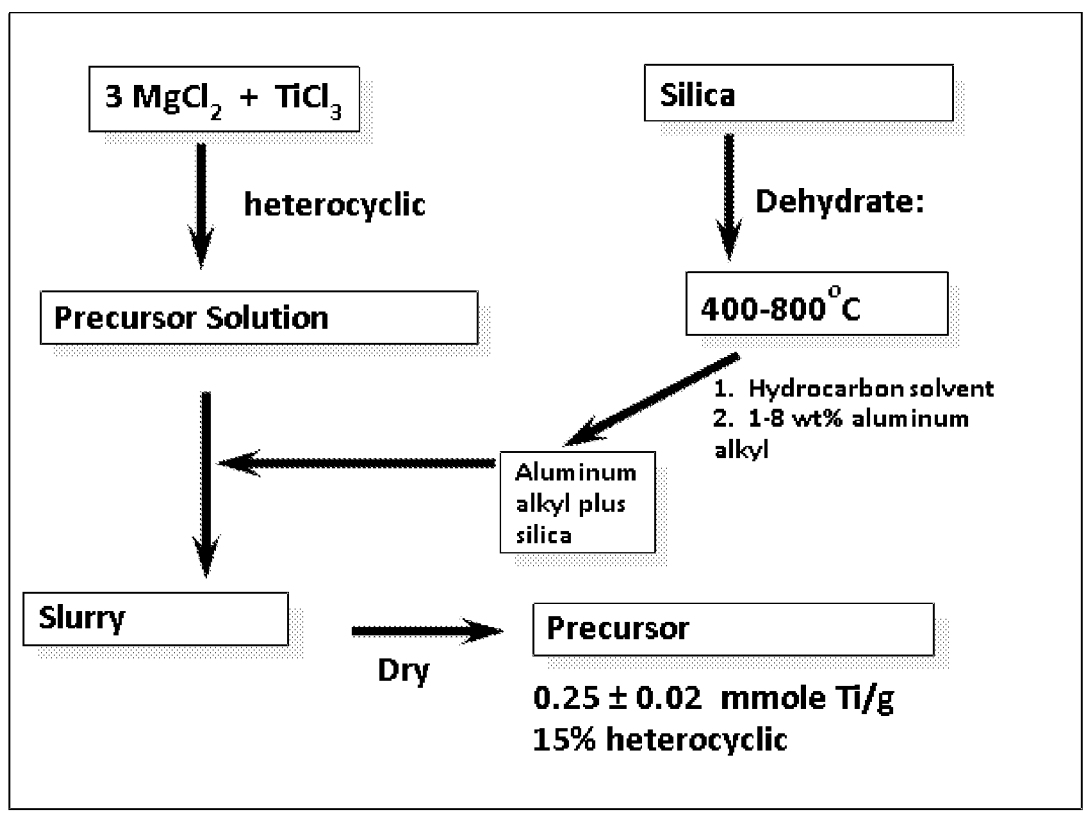
FIG. 2 is a schematic of the synthesis of a ZN catalyst followed by a reduction of the ZN catalyst with at least one alkyl aluminum compound.

In any of the embodiments described in FIG. 2, the contacting of the at least one titanium compound in the precursor composition with the aluminum alkyl compound may include providing a molar ratio of the aluminum alkyl compound to the at least one titanium compound in a range from 1:1 to 10:1, in a range from 2:1 to 5:1, in a range from 4:1 to 8:1, in a range from 0.2:1 to 1:1, in a range from 0.1:1 to 1:1, or in a range from 0.05:1 to 1:1.

In an embodiment, precipitating the at least one magnesium compound with the at least one titanium compound on the carrier material includes: dissolving the at least one magnesium compound and the at least one titanium compound in a molar ratio of 3:1 to 5:1 (mole the at least one magnesium compound:mole at least one titanium compound) in tetrahydrofuran to form a magnesium compound/titanium compound solution; mixing the carrier material in the magnesium compound/titanium compound solution; and removing the tetrahydrofuran to form the precursor composition of the ZN catalyst.

In a class of embodiments, the polymerization process comprises: a) preparing a Ziegler-Natta (ZN) catalyst by contacting the ZN catalyst with at least one aluminum alkyl compound to produce a reduced ZN catalyst; b) optionally, drying the reduced ZN catalyst; c) storing and/or transporting the reduced ZN catalyst for at least 20 days at a temperature of 25° C. or less; d) polymerizing one or more olefin monomers under polymerizable conditions with the reduced ZN catalyst; and e) recovering the polyolefin polymers. Such a process is directed at preserving the catalyst activity or reducing the loss of catalyst of the ZN catalysts.

In particular, ZN catalyst may be activated by different methods and chemistries. One example includes forming a Ti/MG/donor complex on $MgCl_2$, silica, or other support. Then, the co-catalyst may be added to the polymerization reactor directly or to the catalyst feed system. In other examples, ZN catalysts are made by depositing a Ti/Mg/THF complex onto dehydrated silica that also has an aluminum alkyl compound added to the silica to remove residual hydroxyl groups. Its activity may then be adjusted for the production of various polymer products with varying levels of aluminum alkyl compound(s) such as for making linear low density polyethylene (LLDPE) requiring higher levels of aluminum alkyl compounds. Such ZN catalysts appear to be more susceptible to aging effects due to temperature and time.

In an embodiment, the reduced ZN catalyst has substantially the same catalyst activity during the storing and/or transporting. Various methods have been suggested for measuring catalyst activity. For instance, Brummer, Oliver et al., "High-Throughput Screening Applied To Process Development," Handbook of Combinatorial Chemistry, Vol. 2, 2002, pages 864-884; Boussie, T. R. et al., "A Fully Integrated High-Throughput Screening Methodology for the Discovery of New Polyolefin Catalysts: Discovery of a New Class of High Temperature Single-Site Group (IV) Copolymerization Catalysts," Journal of the American Chemical Society (2003), 125(14), pages 4306-4317; Murphy, Vince et al., "High-Throughput Approaches For The Discovery And Optimization Of New Olefin Polymerization Catalysts," Chemical Record (2002), 2(4), pages 278-289; and Boussie T. R. et al., "A Fully Integrated High-Throughput Screening Methodology For The Discovery Of New Polyolefin Catalysts Discovery Of A New Class Of High Temperature Single-Site Group (IV) Copolymerization Catalysts," Journal of the American Chemical Society (2003), 125(14), pages 4306-17. Various test methods are also discussed in U.S. Pat. No. 6,440,745, U.S. Publication No. 2003/161763, and PCT Publication Nos. WO 1999/064160; WO 2001/098371; and WO 2000/009255. A particularly useful method is known as the "accelerated aging method" disclosed in WO 2008/060512, beginning on page 30. It is the method that is applied unless otherwise stated.

As used herein, "substantially" refers to having the essential elements to produce the same or similar result. In other embodiments, "substantially" refers to within 40% of a first and second reference point or value, within 37% of a first and second reference point or value, within 35% of a first and second reference point or value, within 30% of a first and second reference point or value, within 25% of a first and second reference point or value, within 15% of a first and second reference point or value, within 10% of a first and second reference point or value, within 5% of a first and second reference point or value, or within 2% of a first and second reference point or value.

In another class of embodiments, the reduced ZN catalyst may comprise a $T_0$ catalyst activity at the beginning of the storing and/or transporting and a $T_1$ catalyst activity at the end of the storing and/or transporting, and wherein the $T_1$ catalyst activity is within 65% of the $T_0$ catalyst activity, and wherein the $T_1$ catalyst activity is within 75% of the $T_0$ catalyst activity, wherein the $T_1$ catalyst activity is within 80% of the $T_0$ catalyst activity, wherein the $T_1$ catalyst activity is within 85% of the $T_0$ catalyst activity, wherein the $T_1$ catalyst activity is within 90% of the $T_0$ catalyst activity, or wherein the $T_1$ catalyst activity is within 95% of the $T_0$ catalyst activity. As used herein, "storing" refers to a period that runs from the end of catalyst production to the beginning of transporting the catalyst to the polymerization unit facility. Storing may also include, in the aggregate with the aforementioned, "additional storing" that spans the interim period where a catalyst has arrived at a polymerization unit facility but awaits being introduced into the polymerization reactor or catalyst feeder. As used herein, "transporting" refers to a period that runs from the end of storing, including any additional storing, to arriving at the polymerization unit facility, including any intermediate stops or detours of various durations.

The storing and/or transporting of the reduced ZN catalyst may be for at least 20 days, at least 30 days, at least 60 days, at least 90 days, at least 120 days, at least 180 days, at least 270 days, or at least 365 days.

The storing and/or transporting of the reduced ZN catalyst may be at a temperature of 25° C. or less, 20° C. or less, 15° C. or less, 12° C. or less, 10° C. or less, 5° C. or less, or 2° C. or less.

The catalysts are typically placed, stored, and/or transported in portable containers or vessels for storage or shipment between the catalyst production facilities and the polymerization unit facilities. The portable containers or vessels may be moved locally within a plant site or may be shipped by truck, plane, or ship to other plant locations around the world. The portable vessels may be cylinders, drums, DOT approved containers, or any other suitable portable vessel. In order to control the aging of the catalyst, the container or vessel may be held at controlled temperatures as described herein. In one embodiment, the container or vessel is held at a controlled temperature by placing the container or vessel in a controlled temperature environment, such as a refrigerated truck or shipping vessel. Alternatively, the portable vessel may be provided with any other suitable method of maintaining the interior of the portable vessel at a controlled temperature. For example, the container or vessel may have an interior or exterior cooling element or means to maintain the controlled temperature.

Polymerization Processes

The catalysts may be used to polymerize one more olefin monomers to make polymers in any desired polymerization process. For instance, suitable polymerization processes may include high pressure, solution, slurry, super-critical, and/or gas phase processes. For the sake of brevity and illustration purposes only, embodiments of the present invention will be further described below with regard to the polymerization of ethylene monomer to make polyethylene using a gas phase, fluidized bed polymerization process.

In very general terms, a gas phase, fluidized bed polymerization process for producing polyethylene polymers and other types of polyolefin polymers is conducted by passing a gaseous stream containing ethylene and optionally, one or more comonomers continuously through a fluidized bed reactor under reactive conditions and in the presence of one or more catalysts at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous (co)monomer, is continuously withdrawn from the reactor, compressed, cooled and recycled into the reactor. Product is withdrawn from the reactor and make-up (co)monomer is added to the system, e.g., into the recycle stream or reactor, to replace the polymerized monomer.

An industrial-scale reactor that may be utilized is capable of producing greater than 227 kg of polymer per hour (Kg/hr) to about 90,900 Kg/hr or higher of polymer. The reactor may be capable of producing greater than 455 Kg/hr, or greater than 4540 Kg/hr, or greater than 11,300 Kg/hr, or greater than 15,900 Kg/hr, or greater than 22,700 Kg/h, or greater than 29,000 Kg/hr, or greater than 45,500 Kg/hr. Such reactors, for example, can have an inner diameter of at least about 6 inches in the region where the fluid bed resides, and is generally greater than about 8 feet on the industrial-scale, and can exceed 15, 17, 20, or 23 feet.

The conditions for polymerizations vary depending upon the monomers, catalysts and equipment availability. The specific conditions are known or can be readily determined by those skilled in the art. For example, the temperatures can range from about −10° C. to about 120° C., often about 15° C. to about 110° C. Pressures can be within the range of about 0.1 bar to about 100 bar, such as about 5 bar to about 50 bar. Additional details of the polymerization process and reaction conditions can be found in U.S. Pat. No. 6,627,713.

The gas phase process can be operated in a condensed mode, where an inert or induced condensable/condensing agent/fluid is introduced to the process to increase the cooling capacity of the reactor system. These inert condensable fluids are referred to as induced condensing agents or ICA's. Condensed mode processes are further described in U.S. Pat. Nos. 5,342,749 and 5,436,304.

Additional processing details are more fully described in, for example, U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,804,678; 6,362,290; and 6,689,847.

The term "polyethylene" refers to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s). Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

In a class of embodiments, the one or more olefin monomers may comprise $C_2$-$C_{12}$ olefin monomers. In another class of embodiments, the one or more olefin monomers may comprise ethylene and a $C_3$-$C_8$ α-olefin monomer.

Other useful comonomers include conjugated and non-conjugated dienes, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexane, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

End Use Applications

The ZN catalysts may be employed in polymerization processes to produce a variety of polymers to be fabricated along or with other polymers and/or materials in a variety of end-use applications. Such end-uses applications include, without limitation, films (e.g., blown and cast, optionally, oriented MD and/or TD), film-based products, film cells, film membranes, wrap films, diaper components, diaper backsheets, housewrap, personal care containers, pouches, stand-up pouches, liners, geo membranes, greenhouse films, bags, packaging, wire and cable coating compositions, articles formed by molding techniques, e.g., injection or blow molding, extrusion coating, foaming, casting, and combinations thereof.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

A catalyst aging study was conducted using a Ziegler-Natta (ZN) catalyst sold under the trade name UCAT™ A Catalyst available from Univation Technologies, LLC, Houston, Tex. The ZN catalyst was reduced by contacting it with at least one aluminum alkyl compound to produce a reduced ZN catalyst.

Heat aged samples were stored at the temperatures and times listed in Table 1 in a bomb with a pressure gauge in an oven under nitrogen conditions. The bomb was periodically checked to insure that the nitrogen conditions were being maintained. Catalyst activity as determined by a thirty minute slurry homopolymerization at 85° C., 200 psi $C_2$, and sufficient $H_2$ to yield 1 MI resin ($I_{2.16}$ or simply $I_2$ for shorthand according to ASTM D1238, condition E (190° C./2.16 kg)).

Table 1 below shows the amount of aluminum alkyl reduction with the aging condition, i.e., temperature, along with the catalyst activity change or loss.

TABLE 1

| Catalyst Formulation | Aging Condition | Time, years | Activity Change (%) |
|---|---|---|---|
| Precursor |  | 1.0 | 0 |
|  | 40° C. | 0.9 | −10 |
| 2000 |  | 0.6 | 0 |
|  | 40° C. | 0.5 | 0 |
| 2020 | NJ ambient | 2.0 | −33 |
| 4520 (3 different batches) | NJ ambient | 0.8 | −33 (all at −33) |
|  |  | 1.2 | −43 (−25 to −58) |
|  |  | 2.0 | −36 (−24 to −48) |
| 5030 |  | 1.1 | −10 |
|  | 40° C. | 0.9 | −30 |

As shown in Table 1, the highly reduced ZN catalysts lose activity over time when exposed to temperatures greater than ambient. In particular, the catalyst activity loss is at ~40% within one year. In contrast, lightly reduced ZN catalyst (0.17 TNHAL/THF) shows no sign of activity loss after half a year at 40° C.

A second study was conducted comparing no refrigeration to refrigeration. As FIG. 1 shows, the aging rate of the highly reduced catalyst was reduced in half with refrigerated containers at 5° C. and the loss of catalyst activity was related to hours stored at >25° C.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process for reducing the loss of catalyst activity of a Ziegler-Natta catalyst, the process comprising:
   a) preparing a Ziegler-Natta (ZN) catalyst by contacting the ZN catalyst with at least one aluminum alkyl compound to produce a reduced ZN catalyst;
      wherein the preparing further comprises providing a precursor composition of the ZN catalyst comprising at least one titanium compound;
   contacting the at least one titanium compound in the precursor composition with the aluminum alkyl compound in a hydrocarbon solvent using a molar ratio of the aluminum alkyl compound to the at least one titanium compound in a range from 4:1 to 8:1, where the aluminum alkyl compound converts the at least one titanium compound in the precursor composition into a modified state of the ZN catalyst; and
   removing at least a portion of the aluminum alkyl compound in the hydrocarbon solvent not consumed in converting the at least one titanium compound into the modified state
   b) optionally, drying the reduced ZN catalyst; and
   c) storing and/or transporting the reduced ZN catalyst for at least 20 days at a temperature of 15° C. or less.

2. The process of claim 1, wherein the reduced ZN catalyst has substantially the same catalyst activity during the storing and/or transporting.

3. The process of claim 1, wherein the reduced ZN catalyst comprises a T0 catalyst activity at the beginning of the storing and/or transporting and a T1 catalyst activity at the end of the storing and/or transporting, and wherein the T1 catalyst activity is at least 75% of the T0 catalyst activity.

4. The process of claim 1, wherein the reduced ZN catalyst comprises a T0 catalyst activity at the beginning of the storing and/or transporting and a T1 catalyst activity at the end of the storing and/or transporting, and wherein the T1 catalyst activity is at least 85% of the T0 catalyst activity.

5. The process of claim 1, wherein the storing and/or transporting of the reduced ZN catalyst is for at least 30 days.

6. The process of claim 1, wherein the storing and/or transporting of the reduced ZN catalyst is for at least 60 days.

7. The process of claim 1, wherein the storing and/or transporting of the reduced ZN catalyst is for at least 90 days.

8. The process of claim 1, wherein the storing and/or transporting of the reduced ZN catalyst is at a temperature of 20° C. or less.

9. The process of claim 1, wherein the storing and/or transporting of the reduced ZN catalyst is at a temperature of 10° C. or less.

10. The process of claim 1, wherein the aluminum alkyl compound is selected from the group consisting of at least one of tri-n-hexyl aluminum, triethyl aluminum, diethyl aluminum chloride, trimethyl aluminum, dimethyl aluminum chloride, methyl aluminum dichloride triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{12}O)AlCl_2$, and combinations thereof.

11. The process of claim 1, wherein the hydrocarbon solvent is selected from the group consisting of at least one of isopentane, hexane, heptane, toluene, xylene, naptha, and combinations thereof.

12. The process of claim 1, wherein the hydrocarbon solvent is an aliphatic mineral oil.

13. The process of claim 1, wherein providing the precursor composition further comprises precipitating at least one titanium compound on a carrier material.

14. The process of claim 1, wherein the at least one titanium compound has the formula Ti(OR)aXb, wherein R is selected from the group consisting of a C1 to C25 aliphatic or aromatic, substituted or unsubstituted, hydrocarbyl group; X is selected from the group consisting of Cl, Br, I, and combinations thereof; a is selected from the group consisting of 0, 1 and 2; b is selected from the group 1, 2, 3, and 4; and a+b=3 or 4.

15. The process of claim 1, wherein the at least one titanium compound is selected from the group consisting of at least one of TiCl3, TiCl4, Ti(OCH3)Cl3, Ti(OC6H5)Cl3, Ti(OCOCH3)Cl3, Ti(OCOC6H5)Cl3, and combinations thereof.

16. The process of claim 13, further comprising precipitating at least one magnesium compound with the at least one titanium compound on the carrier material.

17. The process of claim 16, wherein the at least one magnesium compound has the formula MgX2, wherein X is selected from the group consisting of Cl, Br, I, and combinations thereof.

18. A process for polymerizing polyolefin polymers, the process comprising contacting one or more olefin monomers under polymerizable conditions with a reduced ZN catalyst of claim 1 and recovering the polyolefin polymers.

* * * * *